United States Patent [19]

Eyres

[11] 4,131,010
[45] Dec. 26, 1978

[54] HYDRAULIC TEST SET

[75] Inventor: William G. Eyres, Salt Lake City, Utah

[73] Assignee: E-Systems, Inc., Dallas, Tex.

[21] Appl. No.: 849,770

[22] Filed: Nov. 9, 1977

[51] Int. Cl.² .......................................... G01M 19/00
[52] U.S. Cl. ........................................ 73/11; 73/168
[58] Field of Search ................. 73/11, 168; 92/78, 79

[56] References Cited

U.S. PATENT DOCUMENTS

| 3,098,382 | 7/1963 | Hoffman | 73/168 |
|---|---|---|---|
| 3,720,091 | 3/1973 | Kiefer | 73/11 |

Primary Examiner—S. Clement Swisher
Assistant Examiner—Denis E. Corr
Attorney, Agent, or Firm—Robert V. Wilder

[57] ABSTRACT

In-place testing of hydraulic shock suppressors is accomplished by apparatus that selectively pumps hydraulic fluid into the shock suppressor cavities. The rate and direction of flow of the fluid is measured to determine the condition of the valves, pistons and other components within the shock suppressor. While the test apparatus is attached, the piston can be forced to traverse through all or a part of its operational distance. Additionally, the fluid within the shock suppressor can be filtered, deaerated and replenished as necessary.

10 Claims, 1 Drawing Figure

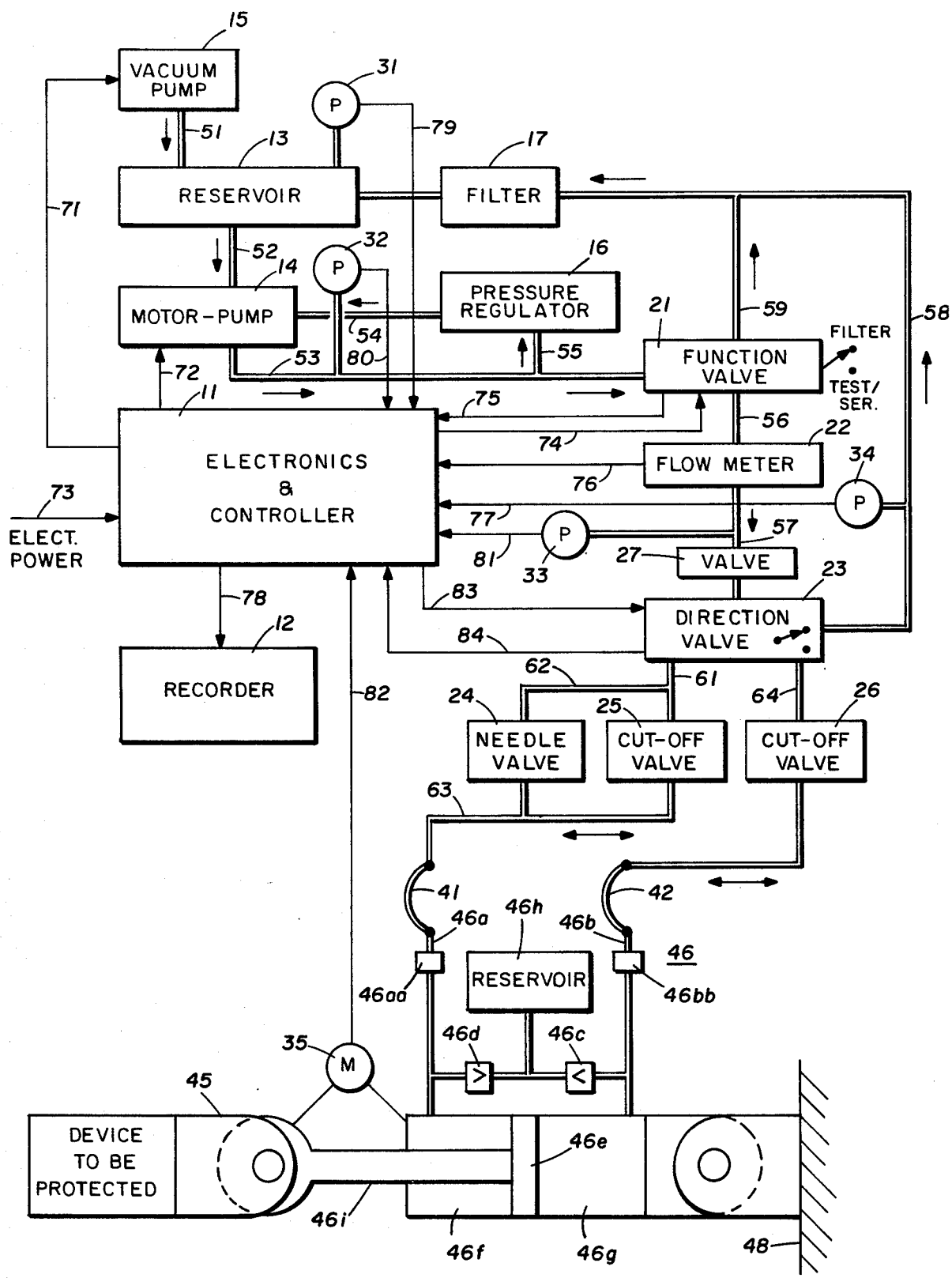

HYDRAULIC TEST SET

FIELD OF THE INVENTION

This invention relates to apparatus for the testing of hydraulic shock suppressors, and more particularly to an apparatus for in-place testing of shock suppressors by pumping hydraulic fluid directly into the shock suppressor fluid cavities.

BACKGROUND OF THE INVENTION

In the prior art, large fixed-place hydraulic shock suppressors, such as those used in nuclear power facilities, have to be removed from the installed position, tested, and reinstalled after completion of the testing. Tests which are periodically required on such hydraulic shock suppressors include: examination of the mechanical integrity of the pistons and valves, cleaning and the operating fluid, and checking properly filling the fluid reservoir. It is a costly and time consuming process to remove the shock suppressor from its installation, mount it in a test stand and reinstall it for service.

In accordance with the present invention there is provided an apparatus for in-place testing a shock suppressor and for cleaning and replenishing the hydraulic fluid without removing the shock suppressor from its service mounting.

SUMMARY OF THE INVENTION

The present invention provides for in-place testing of a hydraulic shock suppressor by apparatus which includes means for pumping hydraulic fluid into the cavities of the shock suppressor, valves for controlling the flow direction and rate of flow of the hydraulic fluid into the cavities of the suppressor, a gauge for measuring the rate of flow of the hydraulic fluid, gauges for measuring various hydraulic pressure, and a meter for measuring the movement of the piston within the shock suppressor. Also included are apparatus for filtering, and replenishing the hydraulic fluid of the shock suppressor.

BRIEF DESCRIPTION OF THE DRAWING

The FIGURE is a block diagram showing the hydraulic test set and shock suppressor.

DETAILED DESCRIPTION OF THE PREFERRED EMBODIMENT

Referring to the FIGURE, there is illustrated the hydraulic test set of the present invention installed to test an in-place shock suppressor. Hydraulic fluid for the test set and the shock suppressor is stored in a reservoir 13 that is connected to a vacuum pump 15 through a vacuum line 51. Hydraulic fluid is pumped, via a line 52, from the reservoir 13 by a motor pump 14 through a line 53 into a two position function valve 21 and by means of a stub line 55 into a variable pressure regulator 16 and through line 54 back into the motor pump. When the function valve 21 is set to the filter position, line 53 is connected to a line 59 and the hydraulic fluid is circulated in a loop that includes the motor pump 14, through the two position function valve 21, and a filter 17 connected to the reservoir 13. When the function valve is set to the test/service position, the hydraulic fluid is pumped from the motor pump 14 through the function valve 21, a line 56, a flow meter 22, a needle valve 27, and into a two position direction valve 23 through a line 57. The direction valve 23 selectively connects line 57 to either lines 61 or 64. When one of the two lines 61 or 64 is connected to the line 57 through the direction valve 23, the other is always acting as a return path for the hydraulic fluid through the direction valve to a line 58. The hydraulic fluid is pumped through cutoff valves 25 and 26 to flexible hoses 41 and 42. These hoses are connected by means of hydraulic couplings 46a and 46b (which include shutoff valves 46aa and 46bb, respectively) to a shock suppressor 46. Connected in parallel with the cutoff valve 25 is a needle valve 24 having an input line 62 opening into the line 61 and an output port terminating at the line 63.

The hydraulic shock suppressor 46 is rigidly connected to a mounting surface 48 and to a protected device 45 by means of a piston rod 46i. The piston 46e on the piston rod 46i divides the interior chamber of the shock suppressor 46 into cavities 46f and 46g. The two cavities are connected through mutually opposing poppet valves 46c and 46d, thus allowing a flow of hydraulic fluid due to movement of the piston 46e. A hydraulic fluid reservoir 46h is connected to the fluid cavities of the shock suppressor.

An electronics and controller 11 provides a number of functions including applying activating power to the vacuum pump 15 through the electrical line 71 and applying power to the motor pump 14 through electrical line 72. This controller 11 also operates the two position function valve 21 through line 74 and monitors its operation through line 75. In a like manner the electronics and controller 11 applies power for operating the two position direction valve 23 through line 83 and monitors its operation through line 84. This controller 11 also monitors the pressures measured by a reservoir gauge through line 79, a motor pump output gauge 32 through line 80, a pressure gauge 33 through line 81 and a return pressure gauge 34 through line 77. The electronics and controller 11 is connected through an electrical line 78 to a data recorder 12. Also monitored by the electronics and controller 11 is the relative position of the shock suppressor 46 and the protected device 45 as measured by a gauge 35 and reported through an electrical line 82 and flow rate as measured by flow meter 22 through electrical line 76. Power is supplied to the electronics and controller 11 through a power line 73. Typically, the elecronics and controller 11 comprises an assembly of interconnected relays and motor operated switches to perform each of the functions outlined. The monitored pressures and position gauges being sequentially coupled to the data recorder 12 to make a record of the measured data.

The operation of the present invention is described by reference to the FIGURE. The electronics and controller 11, together with the associated vacuum pump 15, reservoir 13, filter 17, motor pump 14, regulator 16, function valve 21, flow meter 22, direction valve 23, needle valve 24, cutoff valves 25 and 26, and various pressure monitors are constructed as a single transportable unit. The unit is transported to the location of the mounted shock suppressor 46 where the flexible hoses 41 and 42 are connected to the hydraulic connectors 46a and 46b of the shock suppressor 46. The shutoff valves 46aa and 46bb are opened and electrical power is then suppied to the controller 11.

If the hydraulic fluid in reservoir 13 contains any entrained air, the vacuum pump 15 is activated to pull a vacuum on the reservoir and the air is removed. When filtering of the reservoir fluid is required, the function valve 21 is set to the filter position and line 53 is connected to line 59. The motor pump 14 is then activated and the fluid is pumped from the reservoir 13 through the function valve 21 then through the filter 17 and back into the reservoir 13.

To test the operation of the shock suppressor 46, the function valve 21 is set to the test/service position where line 53 is connected to line 56. The first step in the testing procedure is to determine if the poppet valves 46c and 46d are open. The motor pump 14 is activated and the variable pressure regulator 16 and/or the needle valve 27 are adjusted until a very slow flow of hydraulic fluid is maintained through line 56 as measured by the flow meter 22. The direction valve 23 is set to connect the fluid to either line 61 or 64. If the flow meter 22 measures a continuous flow of fluid then both of the poppet valves 46c and 46d are opened and working properly. By adjusting the pressure regulator 16, the pressure in the line 55 is increased thereby increasing the fluid flow through the flow meter 22 and direction valve 23. If the direction valve 23 has been set to input hydraulic fluid through the line 61 into the shock suppressor 46, as the fluid flow rate is increased the poppet valve 46d will abruptly close if it is functioning properly. After poppet valve 46d has closed, the pressure in chamber 46f will increase. This will cause the piston 46e to move toward the mounting surface 48. The magnitude of this movement will be measured by the gauge 35 and recorded for evaluation of the operation of the shock suppressor. By recording the pressure measured by gauge 33, and knowing the geometry of the piston it is possible to calculate the frictional resistance and thus proper operation of the shock suppressor 46.

After these measurements have been made, the direction valve 23 is switched to its second position with the fluid applied through line 64 and the cutoff valve 26 into the shock suppressor 46. The same tests and measurements are then made with cavity 46g being pressurized.

While the above tests are being conducted, the fluid from shock suppressor 46 is being pumped back through the direction valve 23 and line 58 through the filter 17 where suspended particulate matter is removed. If desired, the fluid can also be deaerated in the reservoir 13 by activating vacuum pump 15.

The final step of the testing and servicing procedure is to adjust the fluid level in the shock suppressor 46. The direction valve 23 is adjusted to input fluid to the line 61 and the valves 25 and 26 are both closed. The proper amount of fluid is then injected into the shock suppressor 46 and the reservoir 46h by means of the needle valve 24.

Although the invention has been hereinafter described and illustrated in the accompanying drawings with particular reference to a single preferred embodiment, it will be appreciated that numerous modifications and changes may be made therein without departing from the scope of the invention, and thus it is not intended to limit the invention except by the terms of the appended claims.

What is claimed is:

1. Apparatus for in-place testing of a hydraulic shock suppressor having a piston that divides the interior chamber of the shock suppressor into cavities and having a hydraulic fluid reservoir for housing hydraulic fluid which comprises:
    means for storing hydraulic fluid,
    pump means interconnected to said means for storing hydraulic fluid for pumping hydraulic fluid into the cavities of the shock suppressor from said means for storing hydraulic fluid,
    valve means interconnected between said means for storing hydraulic fluid and said pump means for pumping the hydraulic fluid into the cavities of the shock suppressor or alternatively directing the hydraulic fluid into said means for storing hydraulic fluid,
    means interconnected to said valve means for controlling the direction of flow of the hydraulic fluid into the cavities of the shock suppressor,
    means interconnected between said pump means and said valve means for controlling the rate of flow of the hydraulic fluid flowing into the cavities of the shock suppressor,
    means for measuring the rate of flow of the hydraulic fluid flowing to the cavities of the shock suppressor, and
    means for measuring the movement of the piston within the shock suppressor in response to the fluid flowing into the cavities of the shock suppressor.

2. Apparatus for in-place testing of a hydraulic shock suppressor as recited in claim 1 which includes means interconnected between said means for storing hydraulic fluid and said valve means for filtering the hydraulic fluid.

3. Apparatus for in-place testing of a hydraulic shock suppressor as recited in claim 1 which includes means interconnected to said means for storing hydraulic fluid for deaerating the hydraulic fluid.

4. Apparatus for in-place testing of a hydraulic shock suppressor as recited in claim 1 which includes means interconnected between said valve means and the reservoir of the shock suppressor for injecting the hydraulic fluid into the hydraulic fluid of the shock suppressor.

5. Apparatus for in-place testing of a hydraulic shock suppressor as recited in claim 1 which includes:
    means interconnected between said means for storing hydraulic fluid and said valve means for filtering the hydraulic fluid,
    means interconnected to said means for storing hydraulic fluid for deaerating the hydraulic fluid, and
    means interconnected between said valve means and the reservoir of the shock suppressor for injecting the hydraulic fluid into the reservoir of the shock suppressor.

6. Apparatus for in-place testing of a hydraulic shock suppressor having a piston that divides the interior chamber of the shock suppressor into cavities and having a hydraulic fluid reservoir for housing hydraulic fluid which comprises:
    means for storing hydraulic fluid,
    pump means interconnected to said means for storing hydraulic fluid for pumping hydraulic fluid into the cavities of the shock suppressor from said means for storing hydraulic fluid, said pump means including an input for receiving hydraulic fluid from said means for storing hydraulic fluid and an output for directing hydraulic fluid to the cavities of the shock suppressor,
    a variable pressure regulator connected between said output and input of said pump means to control the rate of flow of the hydraulic fluid flowing to the shock suppressor,
    a two position function valve interconnected between said means for storing hydraulic fluid and said pump means, such that the interconnection of said means for storing hydraulic fluid, said pump means and said two position function valve define a circulating path of the hydraulic fluid, said two position function valve being operable to selectively connect the shock suppressor to said circulating path of the hydraulic fluid, such that the hydraulic fluid flows to the shock suppressor or bypasses said circulating path of the hydraulic fluid, such that the hydraulic fluid is blocked from flowing to the shock suppressor, and a two position direction valve to select the direction of flow of the hydraulic fluid through the cavities of the shock suppressor.

7. Apparatus for in-place testing of a hydraulic shock suppressor as recited in claim 6 which includes means for measuring the position of the piston within the interior chamber of the shock suppressor.

8. Apparatus for in-place testing of a hydraulic shock suppressor as recited in claim 6 which includes:

valve means interconnected between said two position direction valve and the cavities of the shock suppressor for injecting the hydraulic fluid into the shock suppressor, means interconnected to said means for storing hydraulic fluid for deaerating the hydraulic fluid, and pressure meters to monitor the hydraulic pressure at the input and output to said pump means and at the hydraulic connections to said shock suppressor.

9. Apparatus for in-place testing of a hydraulic shock suppressor as recited in claim 8 which includes a controller unit that:

controls said pump means,
operates said two position function valve,
operates said two position direction valve,
operates said means for deaerating, and
monitors said pressure meters.

10. Apparatus for in-place testing of a hydraulic shock suppressor as recited in claim 9 which includes a meter for measuring the rate of flow of the hydraulic fluid flowing into the cavities of the shock suppressor, said rate of flow being monitored by said controller unit.

* * * * *